Figure 1:
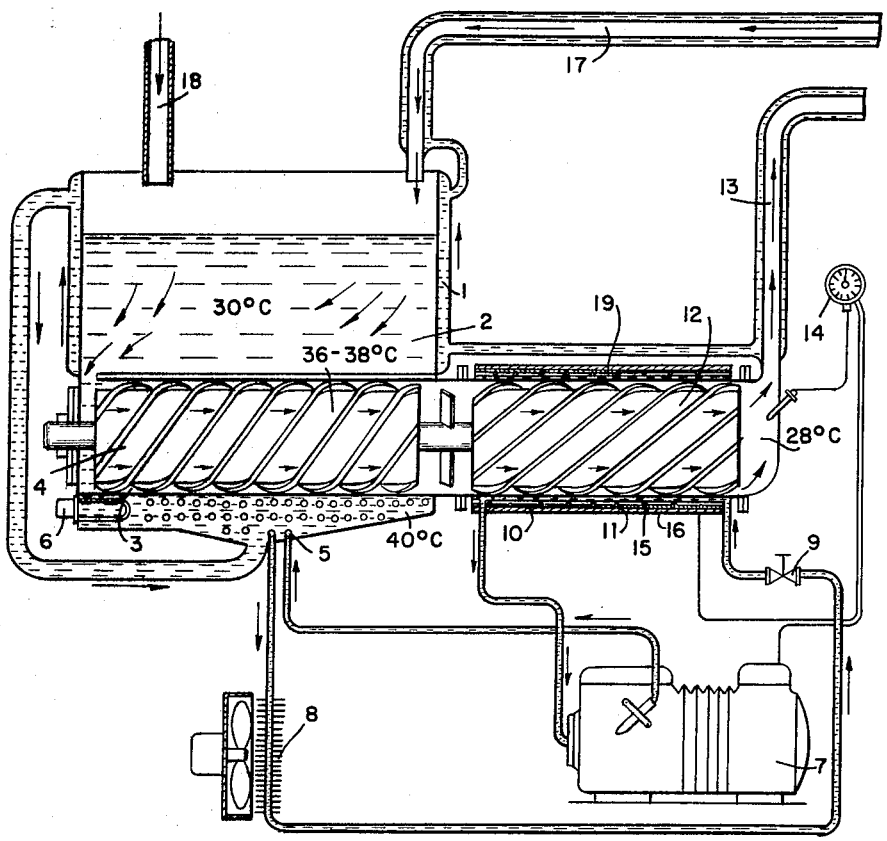

Dec. 28, 1965 R. SOLLICH 3,225,821
PROCESS AND APPARATUS FOR MAINTAINING CONTROLLED
TEMPERATURES IN CHOCOLATE CANDY MASSES
Filed Sept. 26, 1963

INVENTOR.
ROBERT SOLLICH
BY
ATTORNEY

United States Patent Office
3,225,821
Patented Dec. 28, 1965

3,225,821
PROCESS AND APPARATUS FOR MAINTAINING CONTROLLED TEMPERATURES IN CHOCOLATE CANDY MASSES
Robert Sollich, Auf der Breden 12,
Bad Salzuflen, Germany
Filed Sept. 26, 1963, Ser. No. 311,879
Claims priority, application Germany, Sept. 27, 1962,
S 81,711
6 Claims. (Cl. 165—30)

The present invention relates to a process and apparatus for maintaining a predetermined temperature of chocolate candy masses and more particularly to providing a predetermined temperature of the candy masses in an extrusion machine just prior to discharging and using the mass.

It is known that candy masses are brought just prior to their ultimate use from an untempered state corresponding generally to a temperature above 35° C. into the so called tempered state wherein the temperature, depending on the composition of the candy mass, must be reduced to between 26 and 31° C. This temperature state represents a cooled state in which the candy mass begins to solidify.

A large number of processes and apparatus are known which maintain a predetermined temperature state of the mass and which employ almost exclusively water as the cooling agent. However, difficulties arise in the case where a forming machine requires a large amount of tempered candy mass for carrying out the working process while it actually uses only a small amount of this mass on an hourly basis. As an example, a candy coating machine may be mentioned in which about 100 kg. of coating mass is used per hour while between 2000 and 3000 kg. of tempered candy mass must be available for properly carrying out the coating operation.

It is also known that the candy mass undergoes a continuous change in the tempered state and that it is necessary to regenerate the candy mass constantly. This means that the excess mass of candy must be completely or, according to the Sollich circulating process, be at least partly heated and melted again to a temperature of about 36° C. before it is again tempered and is suitable for further working. In this regenerating operation the heat for the melting process and the cold for the cooling process are required in approximately the same ratio.

This procedure of a continuous cooling and reheating of the candy mass is naturally very uneconomical if one considers that before the cooling or tempering of 1 kg. of candy mass approximately 1 liter of regular tap water is necessary, and for heating the mass the previously extracted energy quantity must again be expended.

It is therefore an object of the invention to avoid the aforementioned uneconomical features without altering the working operations of the known forming machines.

The invention provides a process and apparatus which employs a conventional coolant evaporator in which the necessary cooling output is obtained preferably by direct evaporation of the coolant in the cooling cylinder surrounding the conveyor means in the forward end of the conveyor cylinder of the extrusion machine. The condensation heat which is developed in accordance with the cooling output is not discharged as in prior art apparatus by means of air or cooling water and thus wasted, but it is transferred to the water jacket surrounding the conveyor means at the rearward end of the conveyor cylinder where the heat energy is required to heat and melt the tempered candy masses which have not been utilized and which have been returned from the forming machine.

Figure 2:
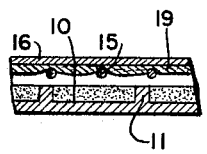

The features and advantages of the process and apparatus of this invention will be apparent from the specification and claims and from the accompanying drawing which illustrate an embodiment of the invention and in which FIG. 1 is a side elevation view of the temperature control apparatus of this invention associated with a conventional screw conveyor device and FIG. 2 is a section through the casing of the evaporator portion of the temperature control apparatus at the forward end of the conveyor device.

In reference to FIGURE 1 the water jacket 1 surrounds the storage container 2. At the lower end of the storage container a heating cylinder 3 is provided which is also surrounded with water, and in which a conveyor screw 4 is mounted rotatably for the purpose of moving the chocolate candy mass through a narrow circular gap along the heated wall surfaces of the cylinder.

When the candy mass leaves the heating cylinder 3 it has a temperature of between 36 and 38° C. so that it is in a molten state and free of any crystal formations of cocoa butter. At its lowest point the water jacket 1 is enlarged in such a way that the condensation coil 5 for the coolant as well as the heating device 6 for controlling the temperature of the water in the jacket may be accommodated. The gas coolant coming from compressor 7 is liquefied in the condensor coil 5. The heat energy liberated during this liquefying process of the gas coolant is delivered preferably to the water jacket 1. Of course it is not necessary that this heat be transferred to a water jacket, because it is conceivable that the condensation heat be delivered, for example, directly to the conveyor cylinder and the candy mass. The heating element 6 is provided in order to transfer heat to the water contained in jacket 1 in the event that the compressor 7 is not operating and it serves additionally as a temperature control when the compressor is operating. The coolant gas which is of a conventional type is liquefied when it leaves condensor 5, but any gas residues are still liquefied in a small air cooled auxiliary condensor 8. Upon leaving the auxiliary condensor the completely liquefied coolant is conducted over an injector valve 9 into the cooling cylinder 11 which comprises a hollow casing 10 having evaporator channels for the coolant facing the heating wire 15 and arranged preferably in helical form. In this cooling zone the untempered candy mass which is heated to at least 36° C. is cooled down again to the working temperature of between 26 and 31° C., depending upon the type of candy mass to be applied.

The conveyor screw 12 mounted in cooling cylinder 11 at the forward end of the apparatus leads the tempered candy mass 13 to the forming machine and provides at the same time a good heat exchange in the cooling cylinder 11. When the candy mass leaves the cooling cylinder 11 its temperature is measured by the built-in control and by regulating member 14.

In order to avoid disturbances in the automatic working process of the device it is preferable to design the compressor 7 for an output which is about 5–10% larger than is required for the actual cooling of the mass. The lowering of the temperature of the candy mass below the temperature set at the control member 14 is prevented by the automatic operation of a heating wire 15. The heat exchange structure of the cooling cylinder is illustrated more particularly in FIGURE 2 of the drawing. The heating wire 15 is embedded half-way in the wall of cooling cylinder 11 so as to have metallic contact therewith. Surrounding the heating wire, a temperature conducting material 19 is provided which transfers the heating output immediately upon closing the circuit connection to the heating wire quickly and uniformly to the cooling cylinder 11. The heating wire 15 as well as the cooling cylinder 11 are provided on the outside with a suitable insulating material 16 to guard against loss of heat and cold. By means of the automatic counter-effect provided by the heating wire 15, temperature variations in the candy mass are limited to a fraction of one degree.

A counter-effect in regard to an excessive cooling of cylinder 11 may also be obtained by enlarging or extending the water jacket 1 so that it will surround the cylinder 11 or by other suitable means so that this control feature is not limited to the employment of a heating wire.

The tempered candy mass 17 which is not utilized in the forming machine, for example in a candy coating machine, is returned to the storage container 2 of the temperature control arrangement illustrated. The actual consumption of candy mass is supplemented by the addition of fresh candy mass 18.

It is to be understood that the invention is not limited to the specific embodiment herein illustrated and described, but may be used in other ways without departure from its spirit as defined by the following claims.

What is claimed is:

1. Apparatus for maintaining controlled temperatures in a chocolate candy mass comprising in combination
   conveyor means for advancing the candy mass along a path and including a heating cylinder and a cooling cylinder serially arranged along said path,
   condensor means disposed in heat exchange relationship with said heating cylinder,
   evaporator means disposed in heat exchange relationship with said cooling cylinder,
   compressor means for circulating a fluid through said condensor means and said evaporator means, expansion means between said condensor means and said evaporator means,
   heating means disposed in heat exchange relationship with said vaporator means,
   means for measuring the temperature of the candy mass at the discharge end of said conveyor means, and
   means for controlling said heating means in response to said temperature measuring means.

2. Apparatus for maintaining controlled temperatures in chocolate candy masses comprising in combination
   conveyor means for advancing the candy masses along a path and including a heating cylinder and a cooling cylinder serially arranged along said path,
   a conveyor screw rotatably mounted in said heating cylinder and in said cooling cylinder,
   a storage container for the candy masses and communicating with said heating cylinder,
   a water jacket disposed in heat exchange relationship with said storage container and said heating cylinder,
   a condensor coil disposed in said water jacket adjacent said heating cylinder,
   heating means in said water jacket adjacent said condensor coil and adapted to supply heat to the water in said water jacket independently of said condensor coil,
   said cooling cylinder having a hollow evaporator casing,
   a fluid compressor having connecting lines for circulating a fluid through said condensor coil and said hollow evaporator casing, expansion means between said condensor means and said evaporator means,
   a heating wire disposed in heat exchange relationship with said evaporator casing,
   means for measuring the temperature of said candy mass at the discharge end of said conveyor means, and
   temperature control means connected to said temperature measuring means and adapted to energize said heating wire in response to temperature indications of said measuring means.

3. The apparatus according to claim 2 including an auxiliary condensor in said connecting lines between said condensor coil and said evaporator casing.

4. The apparatus according to claim 3 wherein said evaporator casing has spirally arranged evaporator channels formed in the wall of said cooling cylinder.

5. The apparatus according to claim 4 wherein said heating wire is a spirally arranged coil partly embedded in the wall of the cooling cylinder and surrounded by a material constituting a good heat conductor.

6. The apparatus according to claim 5 wherein said evaporator casing has a temperature insulating covering.

References Cited by the Examiner

UNITED STATES PATENTS

| | | | |
|---|---|---|---|
| 2,521,081 | 9/1950 | Morrison | 34—77 |
| 2,721,729 | 11/1955 | Van Riper | 165—64 |
| 2,764,878 | 11/1956 | Hachmuth | 62—124 X |
| 3,021,779 | 2/1962 | Sollich | 99—236 |

FOREIGN PATENTS 728,330   4/1955   Great Britain.

ROBERT A. O'LEARY, *Primary Examiner.*

CHARLES SUKALO, *Examiner.*

A. W. DAVIS, *Assistant Examiner.*